Figure 1:
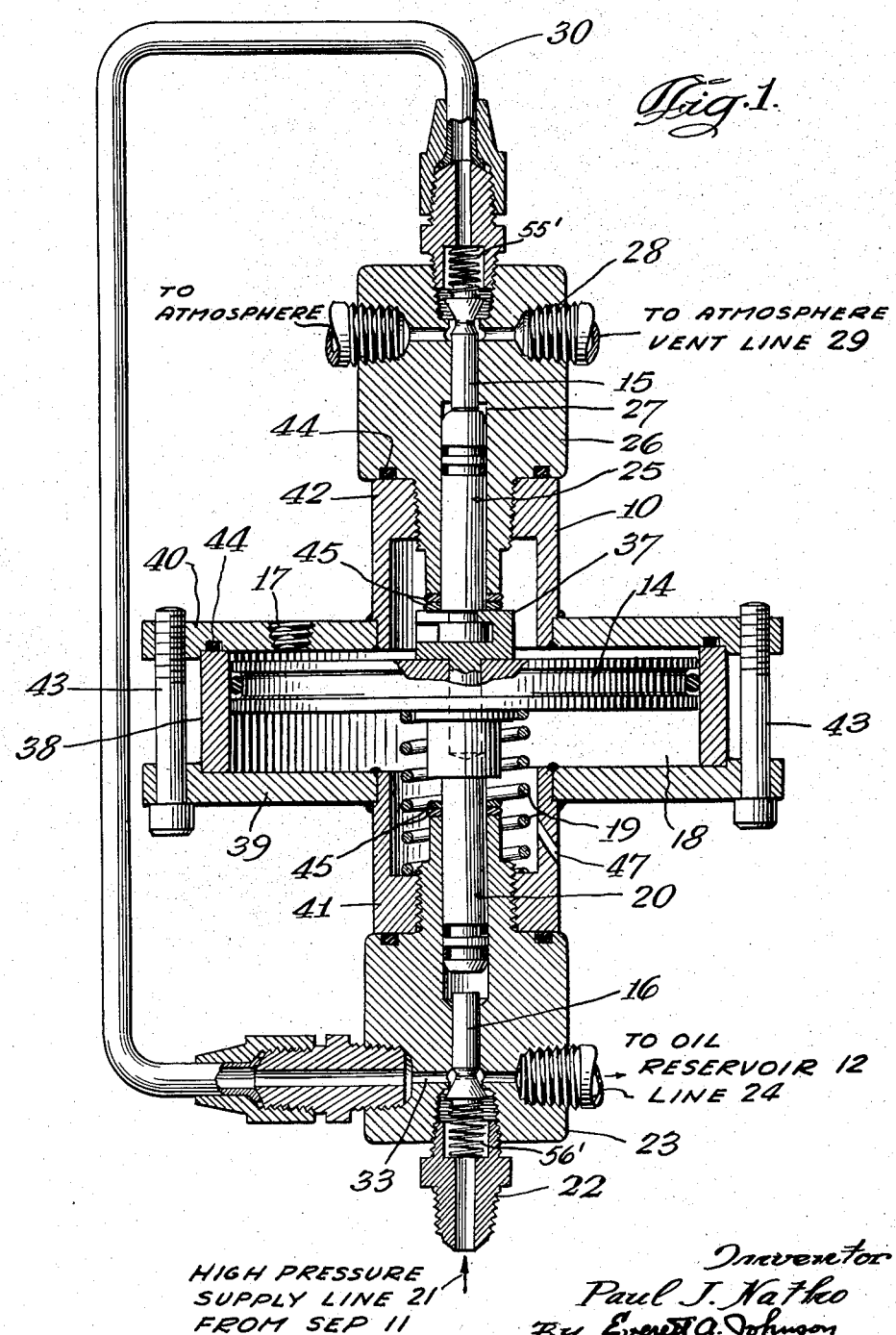

Oct. 27, 1959 P. J. NATHO 2,910,088
PRESSURE RELAY APPARATUS
Filed Aug. 15, 1956 2 Sheets—Sheet 2

Inventor
Paul J. Natko
By Everett A. Johnson
Attorney

United States Patent Office 2,910,088
Patented Oct. 27, 1959

2,910,088

PRESSURE RELAY APPARATUS

Paul J. Natho, Houston, Tex., assignor to Pan American Petroleum Corporation, a corporation of Delaware Application August 15, 1956, Serial No. 604,159

3 Claims. (Cl. 137—596.1)

This invention relates to improvements in controllers for hydraulic systems adapted to operate valves and the like. More specifically, the invention relates to pressure operating interlocking valves.

Valves of this type are designed for use in connection with the control of safety valves employed on flowing oil or gas lines. Such valves are also known as pressure or booster relays.

Valves of designs heretofore proposed have not been entirely satisfactory in all respects and it is a primary object of my invention to provide an interlocking valve structure which is of simple construction, is fool-proof in operation, and which may be actuated by pressure supplied by the line under control. A further object is to provide apparatus adapted to control flow in high pressure lines of the order of 2,500 p.s.i. with a controller pressure of about 30 p.s.i. These and other objects of the invention will become apparent as my more detailed description thereof proceeds.

In general, I attain the objects of my invention by providing an interlocking valve which, when in a first position, communicates high pressure from a gas supply to a flow control valve and, when in a second position, vents the flow control valve and maintains the pressure within the gas supply. The interlocking valve assembly includes a housing and a valve actuator including a piston mounted within the housing such that the actuator moves from a first position against the action of a spring to a second position when fluid pressure is applied to one side of the piston. The valve actuator, in the first position, opens a pressure supply valve and, in the second position, opens a vent valve. The vent valve and the pressure supply valve are arranged such that an interlocking feature is achieved, i.e., both valves are never open at the same time.

Plungers extend from opposite sides of the piston. One plunger actuates the vent valve and the other plunger actuates the pressure supply valve. The ratio of the area of the piston to the area of the pressure supply valve is approximately 100:1 and is great enough to permit a controller pressure of 30 p.s.i. to push the first valve off its seat against a supply pressure of 2,500 p.s.i. or more. When controller pressure is removed from the piston, the spring exerts sufficient force to move the vent valve off its seat.

Figure 2:
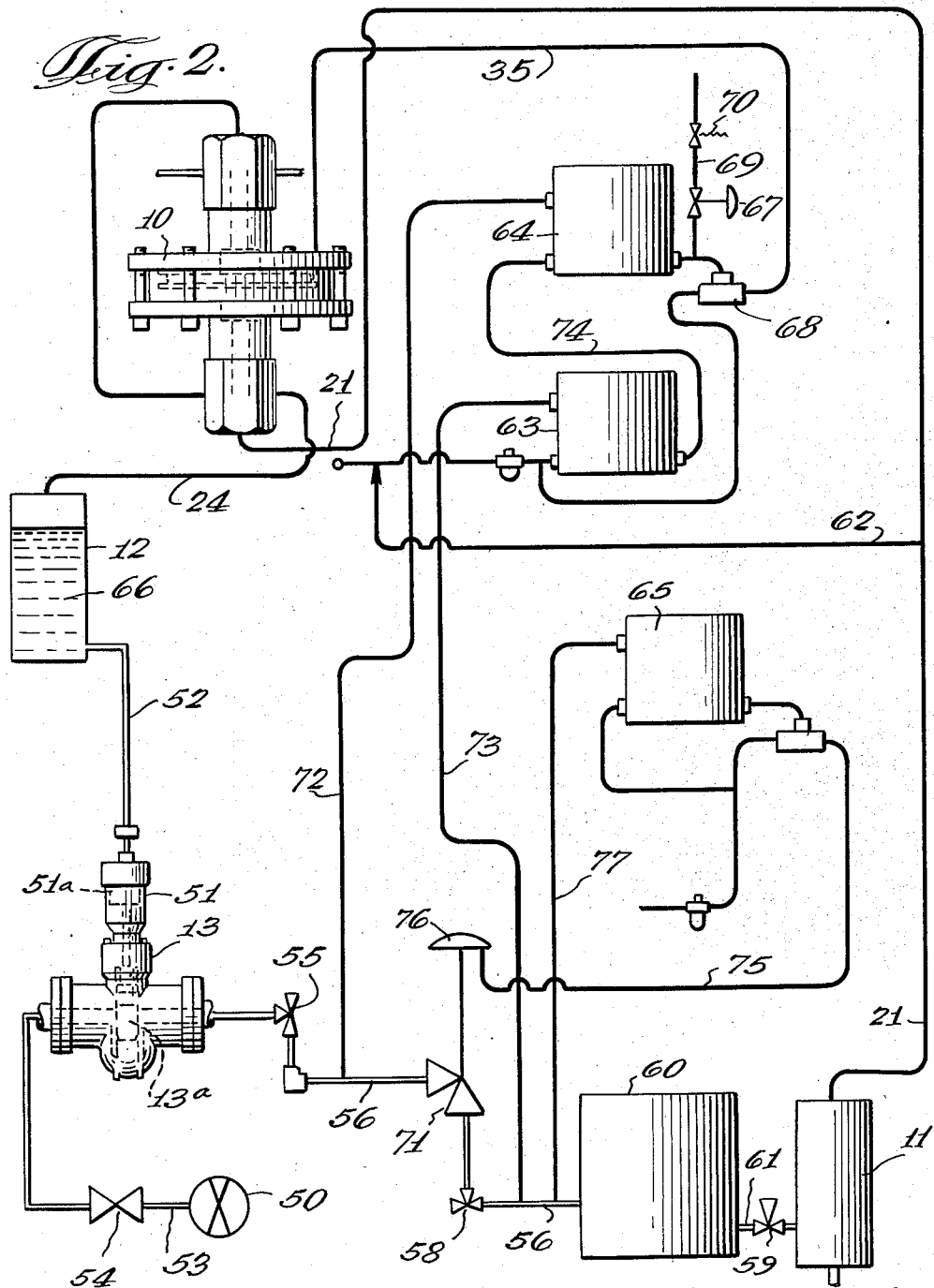

Further details of construction and advantages of my invention will be described by reference to a preferred embodiment thereof illustrated in the drawings and wherein:

Figure 1 is an elevation, partly in section, of a pressure-operated interlocking valve constructed in accordance with my design; and Figure 2 is a schematic showing of a typical installation embodying the valve illustrated in Figure 1.

Referring to Figure 1, I have illustrated a preferred form of the pressure-operated interlocking valve 10. The interlocking valve is designed for high pressure service, i.e. 2,500 p.s.i. or more, but is operated by the 15 to 30 pound output pressure from the pressure controller of the control system illustrated by Figure 2. The interlocking valve, in a first position, is used to admit gas from the separator 11 to the pilot control tank 12 and, in a second position, is used to vent pilot control tank 12 and maintain pressure within separator 11.

In Figure 1 the interlocking valve 10 is shown in its second position with no pressure exerted on the piston 14. In this position, the vent valve 15 is open to the atmosphere and pressure supply valve 16 is closed so that all gas pressure is removed from the pilot control tank 12 and the flow control valve 13 is in a closed position.

Whenever 15 to 30 p.s.i. pressure is applied to the upper side of piston 14 through line 35 and through connection 17, the piston 14 moves downward within chamber 18 compressing spring 19 about the plunger 20, first closing vent valve 15 and then opening pressure supply valve 16. This allows the gas within separator 11 to pass into line 24 and pilot control tank 12, thus opening the flow control valve 13.

Whenever pressure is removed from the upper side of piston 14, the spring 19 returns the piston to its second position thereby removing the gas pressure from the pilot control tank 12 by first closing the pressure supply valve 16 and then opening vent valve 15. The lengths of plungers 20 and 25 are such that as the piston and plungers move downward, the vent valve spring 55' closes the vent valve prior to the time plunger 20 engages the pressure supply valve 16, and as the piston 14 and plungers 20 and 25 move upward, the pressure supply valve spring 56' closes the pressure supply valve 16 prior to the time plunger 25 engages the vent valve 15 thereby providing the interlocking feature.

The vent valve chamber 26 is provided with a longitudinal bore 27 which accommodates the plunger 25 which is secured at its lower end to the piston 14. The vent valve plunger 25 is attached to piston 14 by means of a flexible connection 37 which permits misalignment of various parts without impairing the operation of the valve 10. A tap 28 in the valve chamber 26 provides venting to the atmosphere by means of vent line 29.

The ratio of the area of the piston 14 to the area of the pressure supply valve (approximately 100:1) is great enough to permit a control pressure of 30 pounds in line 35 through connector 17 to displace valve 16 from its seat against the supply pressure in conduit 21 of 2,500 p.s.i. or more.

The operating cylinder 38 of the valve 10 comprises a shallow cylinder closed at both ends by flange plates 39 and 40, each having an internally threaded boss 41 and 42 projecting from opposite surfaces of the plates 39 and 40, which bosses are adapted to receive the pressure supply valve block 23 and the vent valve block 26, respectively. The flange closure plates 39 and 40 are connected to each other by tie bolts 43. Suitable O-ring seals 44 and spacer washers 45 can be provided as is well known in the art.

The top flange plate 40 is provided with a drilled and tapped port 17 for connection to the pressure controller line 35. A vent line 47 is provided for venting that portion of the cylinder 38 below the piston 14. If desired, this vent line 47 may be connected to an expandable bellows chamber (not shown) of such capacity as to permit venting and so as to function as a transducer to indicate and/or record the position of valves 15 and 16 as actuated by the displacement of the piston 14.

In Figure 2, I have illustrated a typical hookup for controlling a high pressure gas well and employing the interlocking valve 10 illustrated in Figure 1. During the production of gas and/or oil from a well 50, a flow control valve 13 is in open position, being so held by the hydraulic cylinder 51. The hydraulic cylinder 51 in turn is actuated by hydraulic pressure in line 52 transmitted by a supply of hydraulic oil contained in the pilot control tank 12 from which gas can be applied or released in order to obtain the desired condition.

The flow control valve 13 employs a fail-closed gate member 13a which has a lower blind and an upper flow port; the gate member is supported by a self-rising stem which in turn is positioned by the hydraulic operator 51 containing piston 51a which acts in opposition to the closing action in the line 56 under control. When the well 50 is producing through the tubing, the flow control valve 13 is placed in the tubing flow wing 53 between the regulator flow wing valve 54 and the flow wing choke 55. The flow control valve 13 is normally closed and it may be opened hydraulically by means of hydraulic pump (not shown) connected between the pilot control tank 12 and the valve operating cylinder 51. The well effluent usually flows to a gas-oil separator 11 which operates at a pressure sufficiently high to furnish the fluid pressure on pilot control tank 12 for the operation of hydraulic valve operating cylinder 51 and hence for holding the flow control valve 13 open.

An embodiment of the flow control valve 13 is described and claimed in my co-pending application Serial No. 594,940, filed June 29, 1956, entitled "Hydraulic Operator and Fail-Safe Surface Valve" and further details of construction of flow control valve 13 will not be presented here.

By way of further explanation and with reference to Figure 2, the gas pressure applied to the pilot control tank 12 must be approximately 500 p.s.i. with a pressure in flow line 56 from well 50 of about 10,000 p.s.i. and it can be obtained from the separator 11 normally operating at 1,000 p.s.i. or higher to meet transmission line requirements. Should gas at this pressure be unavailable from the separator 11 during well testing and other related operations, the operating pressure can be obtained for emergency and short-time operation from a nitrogen cylinder and other portable sources including a hand pump (not shown) which may be connected to the hydraulic line 52.

The hookup for a 10,000 p.s.i. well includes several pressure control points as indicated diagrammatically in Figure 2. To prevent surface erosion on the downstream side of the flow wing choke 55 or within the choke itself, the pressure drop across it is limited by installing several chokes 55, 58 and 59 in series and by proper selection of their sizes distribute the pressure drop equally or approximately equally from each choke.

All pressure reduction above 4,000 p.s.i. can be accomplished with a choke without the benefit of external heat to prevent freezing, therefore it is an advantage to take all pressure drop in the flow line 56 before entering the coils of heater 60 which are generally the weakest point within the well hookup. The well fluids from the heater 60 pass by conduit 61 through choke 59 into separator 11. The high pressure gas from the separator 11 is transfered by conduit 21 to the interlocking valve 10. A portion of the high pressure gas may be diverted by line 62 as the pilot supply to the high and low pressure pilot 63.

To insure the operation of the system with the desired pressure drops across individual chokes 55, 58 and 59 and a safe working pressure in the hydraulic system, controllers 63, 64 and 65 are installed within the system. Thus, whenever pressure conditions are not within the prescribed limits, the well 50 is shut in by means of the flow control valve 13. This is accomplished by having the pilot pressure controllers 63 and 64 interrupt and bleed the pressure from the interlocking valve 10 which applies or releases the 500 p.s.i. pressure to or from the oil 66 in the oil cylinder or pilot control tank 12 as described above. Controller 65 maintains a desired or set pressure in flow line 56 behind choke 58. Should a stoppage of flow occur by the plugging of choke 59 or other cause regulator 71 would close and shut flow control valve 13 due to the action of controller 64 resulting from a rise in pressure in conduit 72. The pressure supply for these pilot pressure controllers 63, 64, and 65 is likewise obtained from the 1,000 p.s.i. separator 11.

This system can be utilized either with automatic or manual reset. Manual reset is accomplished by means of a small spring-loaded valve 67 which is held closed by the output pressure from the pilot pressure controllers 63 and 64 acting on the area of the valve 67. When the output pressure is bled off, the spring opens valve 67 and henceforth releases all output pressure from the booster 68 to the atmosphere via line 69 thereby preventing the automatic re-opening of the flow control valve 13 by way of the pilot control tank 12. The valve 70 must then be manually closed until the output pressure from pressure controllers 63 and 64 can be restored in conduit 69 to close valve 67 thereby applying pressure to the piston 14 to open the interlocking valve 10 as described in connection with Figure 1.

The functions of pressure controllers 63, 64, and 65 in the well hookup are as follows:

When pressure in flow line 56 as controlled by reducing regulator 71, transmitted to controller 64 through conduit 72, exceeds the set pressure of controller 64, the control mechanism bleeds to the atmosphere, the pressure in conduit 35 thereby relieving the pressure from piston 14 and restoring the interlocking valve 10 to its normal position and in turn permitting flow control valve 13 to close. When the pressure in flow line 56 behind the choke 58, transmitted to controller 63 through conduit 73, exceeds the set maximum pressure or drops below the set minimum pressure of controller 63, the control mechanism bleeds the pressure to the atmosphere from conduit 74 and from conduit 35 through controller 64 thereby causing flow control valve 13 to close as described above. Similarly, when the pressure in conduit 56 behind the choke 58, transmitted to controller 65 through conduit 77, exceeds the set pressure of controller 65, the control mechanism bleeds the pressure to the atmosphere which results in decreasing the pressure in conduit 75 and on diaphragm 76 of pressure regulator 71. This reduction of pressure causes regulator 71 to operate so as to restore the desired or set pressure in flow line 56.

As the well 50 is flowing and conditions arise at the control point which would require the operator to close the flow control valve 13, the controllers 63 and 64 bleed the pressure from the interlocking valve 10 which then releases the high pressure gas from the pilot control tank 12 and the pilot control line 24 which in turn relieves the pressure from the valve operating cylinder 51. The pressure within the body of the valve 13 acts on the valve stem and moves the valve gate member outwardly of the valve body to a closed position as described in detail in my co-pending application referred to above.

Although the invention has been described with reference to preferred embodiments thereof, it is to be understood that these are by way of illustration only. As an example, although the operation of the safety valve has been described as being responsive to unusual pressure changes within the well hookup, other controllers responsive to unusual wind velocity, atmospheric temperature or pressure or in the case of offshore operations, controllers responsive to unusual wave action, can be provided for automatically closing the safety valve. Accordingly, it is contemplated that modifications and variations can be made in the apparatus by those skilled in the art in light of the preceding description without departing from the spirit and scope of the invention.

What I claim is:

1. A pressure-operated interlocking valve assembly including a housing, a piston within said housing arranged to move from a first position through a neutral position to a second position, a resilient member within said housing arranged to urge said piston into said first position, a fluid connection to said housing for supplying fluid pressure to said piston for urging said piston into said second position, a pressure supply valve having an upstream side and a downstream side, means extending from said piston to open said pressure supply valve when said piston is in said second position, means to close said pressure supply valve when said piston is in said neutral position and in said first position, a vent valve having an upstream side and a downstream side, means extending from said piston to open said vent valve when said piston is in said first position, means to close said vent valve when said piston is in said neutral position and in said second position, a pressure supply line communicating with said upstream side of said pressure supply valve, a pilot control line communicating with said downstream side of said pressure supply valve, an equalizing line communicating with said downstream side of said pressure supply valve and with said upstream side of said vent valve, and a vent line communicating with said downstream side of said vent valve.

2. A pressure-operated interlocking valve comprising a housing, piston means operable within said housing, a first valve chamber on said housing, a second valve chamber on said housing, said valve chambers being in axial alignment with each other, a first plunger extending from one side of said piston into said first valve chamber, a second plunger carried by said piston and extending into said second valve chamber, a coil spring in said housing about said second plunger, a first valve in said first valve chamber, said first valve being positioned by said first plunger, a second valve in said second valve chamber and positioned by said second plunger, means for applying fluid pressure to one side of said piston remote from said coil spring, a first line communicating with said second valve chamber upstream of said second valve, a second line communicating with said second valve chamber downstream of said second valve, a third line communicating with said second valve downstream of said second valve and communicating with said first valve chamber upstream of said first valve, and a fourth line communicating with said first valve chamber downstream of said first valve.

3. An apparatus for controlling safety valves on high pressure gasiform fluid lines which comprises in combination a housing, a piston of large cross-sectional area dividing said housing into first and second chambers, inlet port means communicating with the said first chamber and adapted to supply fluid pressure to said piston, coil spring means in the said second chamber anchored to said second chamber and urging said piston toward said first chamber, vent valve chamber means carried by said housing, high pressure supply valve means carried by said housing, vent plug means in said vent valve chamber, supply valve plug means in said supply valve chamber, first plunger means movable within said vent valve chamber and fixed to said piston, second plunger means movable within said supply valve chamber and fixed to said piston, high pressure supply line communicating with said supply valve chamber and controlled by said supply valve plug, pressure-equalizing means communicating between said supply valve chamber downstream of the supply valve plug and said vent valve chamber upstream of said vent valve plug, vent means in said vent valve chamber, and fluid supply line means communicating with said supply valve chamber downstream of said supply valve plug.

References Cited in the file of this patent

UNITED STATES PATENTS

| | | |
|---|---|---|
| 1,001,401 | Hicks | Aug. 22, 1911 |
| 1,215,947 | McVoy | Feb. 13, 1917 |
| 1,606,530 | Harris | Nov. 9, 1926 |
| 2,648,346 | Deardorff | Aug. 11, 1953 |